No. 730,701. PATENTED JUNE 9, 1903.
M. PRIETO.
MACHINE FOR CLEANING FIBERS.
APPLICATION FILED JUNE 4, 1902.
NO MODEL. 2 SHEETS—SHEET 2.
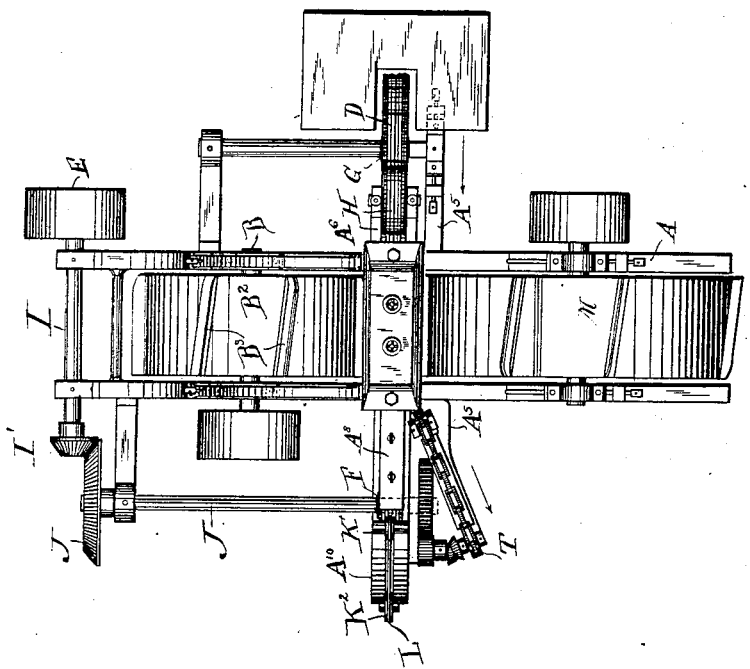
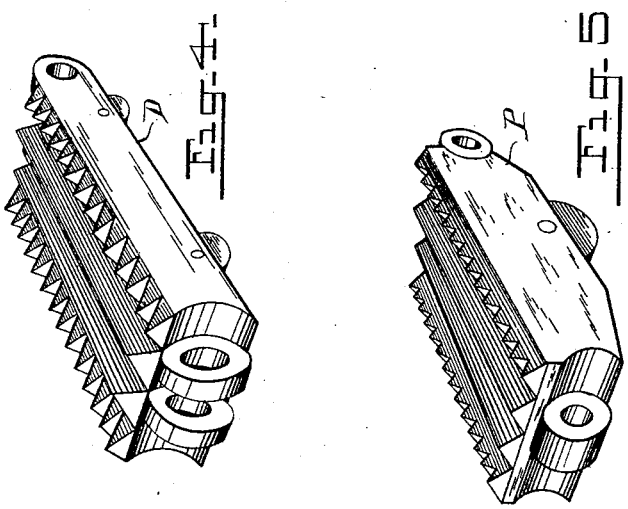
WITNESSES: INVENTOR No. 730,701. Patented June 9, 1903.

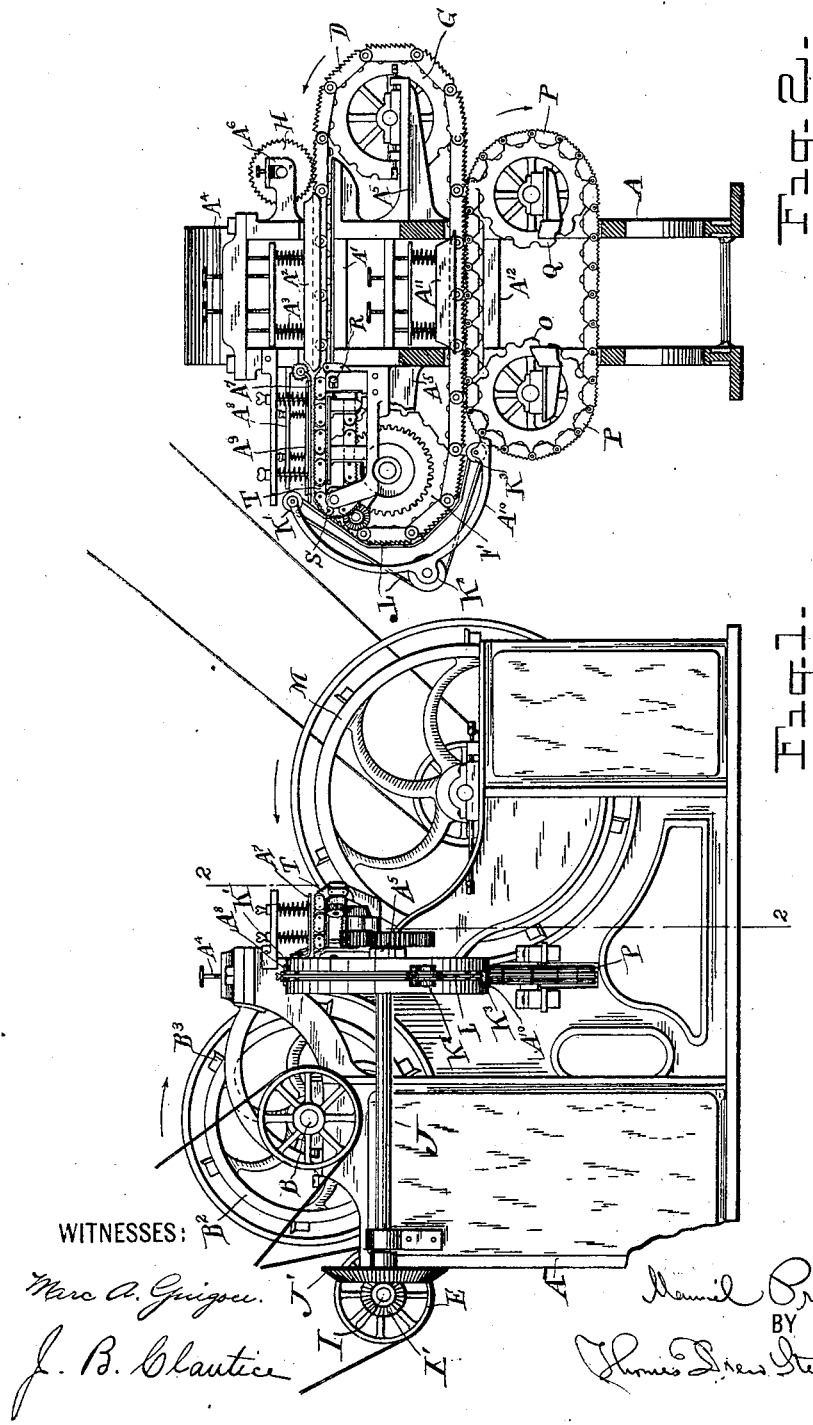

UNITED STATES PATENT OFFICE.

MANUEL PRIETO, OF MEXICO, MEXICO.

MACHINE FOR CLEANING FIBERS.

SPECIFICATION forming part of Letters Patent No. 730,701, dated June 9, 1903.

Application filed June 4, 1902. Serial No. 110,149. (No model.)

*To all whom it may concern:*

Be it known that I, MANUEL PRIETO, a citizen of the Republic of Mexico, residing in the city of Mexico, in the Republic of Mexico, have invented a certain new and useful Improvement in Machines for Cleaning Fibers, of which the following is a specification.

The machine is intended more particularly for treating in a green state portions of plants having strong fibers extending lengthwise therein. It reduces to a broken and more or less pulped condition the outer covering and other material in the plant, leaving the fibers thoroughly cleaned. The plants on which my experiments have been made are a species of aloe, abundant in Central America, known as "*Agave sisalienses.*" I will describe the invention as applied to the treatment of the large and tough leaves of such plants. Many efforts for the extraction of the fibers of this and kindred plants have been previously made by myself and others, one of the earliest examples being set forth in a patent to Demetrio Prieto, dated May 29, 1883, No. 278,668.

The present invention is an improvement over any before known to me in important points.

My improved machine is of the class in which one end of each leaf is presented to the action of rapidly-revolving beaters which remove the undesirable material and then shifting the hold of the feeding means from the untreated to the treated portion and presenting the previously untreated portion of such leaf after such shifting to be in its turn beaten and cleaned. The improvements relate to the means for holding the leaf strongly during the first period in which each is beaten, holding it lightly during the period while it is being shifted, and holding it gently and carrying it automatically by a smooth continuous movement while it is being transferred to the other beater, and, finally, holding it still more efficiently while it is subjected to the second and principal beating.

The following is a description of what I consider the best means of carrying out the invention.

The accompanying drawings form a part of this specification.

Figure 1 is a side view. Fig. 2 is a section on the line 2 2 in Fig. 1, partly in elevation; and Fig. 3 is a plan view with some of the upper portions removed. Fig. 4 is a perspective view showing one of the links of the main carrying-chain on a larger scale. Fig. 5 is a corresponding perspective view of one link of the lower chain.

Similar letters of reference indicate corresponding parts in all the figures where they appear.

A is the fixed framing, of cast-iron or other suitable material, in which are bearings which support a stout shaft B, carrying a drum $B^2$, provided with beaters $B^3$, which beat and clean a short length of the butt-end of the several leaves successively presented to them. The leaves may be introduced by an attendant sitting or standing in a convenient position at the right of the machine, as seen in Fig. 2, and are placed on the endless chain D, which runs over two polygonal wheels F and G, supported by brackets $A^5$, which constitute portions of the main frame and are slowly revolved by gears actuated by a belt (not shown) running on a pulley E. H is a wheel adjustably and yieldingly carried in brackets $A^6$ above this chain and arranged to partially crush that portion of the leaf which is to be grasped. Immediately after this treatment the leaf is carried under a platen $A^2$, with provisions by the screws $A^4$ for adjusting its vertical position and springs $A^3$ for allowing it to yield upward if the upward pressure, due to the passage of the leaf between it and the chain D, becomes excessive. The under surface of the platen $A^2$ is grooved longitudinally. The outer surface of the several links of the chain D are grooved longitudinally to match. Each edge of the bearing-surface of the chain is serrated, as plainly shown in Figs. 2 and 4. The serrations engage the leaf and promote its being traversed along when it is first applied on the exposed surface of the chain, and the grooving of the mid-width of each link and the corresponding grooving of the platen $A^2$ aid in holding the leaf strongly to resist the longitudinal pull due to the action of the beaters. When a leaf has been thus slowly carried past the beating-drum $B^2$, all of the leaf which extends beyond the chain in that direction has been thoroughly cleaned. The untreated portion of the leaf is then seized by an obliquely-traversed chain T, running on wheels R S by the aid of gearing. This chain traverses at a speed just sufficiently in excess of that of the main chain D, and the general position of the leaf is maintained, and there is a sufficiently strong grip between this chain T and a smooth top bar $A^7$, mounted adjustably and yieldingly above, to pull the leaf through its now relaxed grip between the chain D and the surface above.

$A^8$ is a horizontal arm forming a rigid extension from the framing, which by the aid of adjusting-screws and gentle springs, as shown, holds lightly down the top bar $A^9$. This maintains a slight pressure on each leaf and on the fiber to which it has been reduced as the leaf, now cleaned fiber at one end, is carried forward after its escape from the first beater and while it is being moved endwise by the pull which it receives from the stronger grip of the obliquely-traversing chain T. The parts are so adjusted that this motion obtains to a sufficient extent to have only the cleaned fiber of each leaf upon the chain D after it has passed this portion of its route. As this laterally-shifting motion of each leaf approaches completion it is subjected to the pressure of a cord or light chain, which I will term a "band" L, which hugs closely to the chain D as it moves downward in its traverse half around the wheel F. This chain or band L and its mountings will be again referred to farther on. On the emergence of the leaf from the gentle hold between the main chain D and this light chain or band it is seized between the main chain and a stout bottom chain P, which latter runs over two wheels O and Q, and is subjected to a second beating, which cleans the whole of the portion not before treated. The second beating-drum M is like the first beating-drum $B^2$, but acts on the opposite side of the chains and is revolved in the opposite direction. I make this second drum larger, because it has to treat a longer portion of the leaf and fiber. After this second treatment the now completely-cleaned strick of fiber is discharged and may be carried away.

The main chain D and the supplementary or bottom chain P are each provided on its inner face with means for reducing the friction as they move past the strongly-supported backing surfaces provided. In the second treatment, as in the first, there are adjusting-screws and yielding springs. The whole is organized to withstand the strong pressure and hold the material efficiently for each treatment. The engagement of the longitudinally-grooved bottom chain P with the main chain D should be closer than that between the same chain D and the platen $A^2$, because of the reduced quantity of material embraced due to the cleaning. The bottom chain is in shorter links than the main chain. There is only one roller on the inner face of each length of the bottom chain. There are two on the inner face of each of the links of the main chain. The light band or chain L is like the several other chains endless. After each portion of the band has traversed downward in its circuit half around the wheel F it is returned by being caused to pass around pulleys $K'$ $K^2$ $K^3$, held in a framing $A^{10}$, adjusted on the main framing A.

The driving-gear will be readily understood. Belts from suitable pulleys on the motor (not shown) apply directly to the pulleys represented on the shafts of the two beater-wheels. The driving of the chain D is effected by a separate belt running on a pulley E, which is set on a shaft I and through the bevel-wheels $I'$ and $J'$ drives the shaft J, on which is set the polygon F. The chain composed of the links D gets its motion from this polygonal wheel F, the corresponding polygonal wheel G being turned by the chain. The lower chain P, stretched by the wheels O Q, is turned by the friction of the main chain above.

Modifications may be made without departing from the principle or sacrificing the advantages of the invention.

It is highly desirable in practice to allow the grip on the leaves to be yielding when subjected to excessive force from an extra hard or extra large quantity of the material passing through; but I can operate the machine successfully, having the yielding in the first traverse on the under side in place of the unyielding part $A'$ shown, and I can in the second traverse have the yielding below the upper member of the bottom chain P instead of above the lower part of the chain D, as shown, or I can make both surfaces yielding in either or both the places.

Instead of a light chain for the endless flexible band L, I can, as before intimated, use sufficiently stout rope made of similar sisal or other coarse and strong fiber, or I can use leather or other strong material having sufficient flexibility and able to endure the watery and sometimes acid material with which it is worked.

It is important to relieve the chains as far as practicable from friction in their passages first one way and then the other in presenting the leaves for their several portions to be successively treated. I have shown two antifriction-rollers arranged to serve this function on the several links of the main chain D and only one on the corresponding thin face of each of the shorter links of the bottom chain P. These numbers may be varied.

Some of the advantages due to certain features of the invention may be separately enumerated as follows: First, by reason of the fact that the chain D is composed of links which are not only grooved longitudinally on their working faces, but are also serrated on their edges, and of the substantial fixed platen $A^2$, grooved longitudinally, matching thereto, it is easy to supply the material by holding the leaves crosswise in the proper transverse position on the portion of the chain which extends beyond the platen without any danger of injury to the hands of the attendant and to hold the leaves with sufficient firmness for the cleaning of the butts without further holding means; second, by reason of the same, with the addition of the wheel H, which latter by partially crushing destroys the integrity and more or less completely macerates the skin and the pulpy materials of the leaf along so much of the length of the leaf as is to be seized by the chain and platen, I am able to operate with more certainty of success; third, by reason of the two beating-drums $B^2$ and M and of the carrying means T for the shifting of the leaves laterally and of the lightly-pressed top bar $A^9$ for holding the leaves gently down upon the chain D, I am able to insure the continued traverse of the leaves forward and to move them laterally to the extent required certainly and uniformly without allowing them so much liberty as to become displaced; fourth, by reason of the same and of the light continuous band L pressing with considerable force on the leaves and holding them upon the chain D during the traverse of the latter downward and partially around the wheel F, I am able to insure the carrying of the leaves successfully to the second beating-drum M, and thus to attain the complete cleaning of the entire leaf; fifth, by reason of the bottom chain P and its carrying-wheels O and Q and of the adjustable and slightly-yielding platen $A^{11}$, adapted to press on the chain D in this portion of its course, and of the strong support $A^{12}$, arranged to back the chain P, I am able to hold these chains very firmly together and to thereby give the specially strong pressure required to hold the material by its previously-cleaned fiber to allow the main portion of the leaf to be treated by the beating in the opposite direction performed by the second beater M.

I claim as my invention—

1. In a machine for cleaning fiber having means $B^3$ for beating and cleaning, a slightly-yielding adjustable platen $A^2$ grooved in the direction of the feed, in combination with feeding means D having the working surfaces correspondingly grooved longitudinally along a portion of its width and serrated along its edges, arranged to extend beyond the platen with a clear space above adapted to serve, substantially as herein specified.

2. In a machine for cleaning fiber having means $B^3$ for beating and cleaning, a roller H arranged to partially crush the portion of the leaf which is to be held, a stationary platen $A^2$ correspondingly grooved in the direction of the feed and extending beyond the beating means, in combination with feeding means D having the working surfaces correspondingly grooved longitudinally along a portion of its width and also serrated, arranged to extend beyond the platen, all adapted to serve substantially as herein specified.

3. In a machine for cleaning fiber having means $B^3$ for beating and cleaning, two series of beaters arranged to act in succession on the several leaves, a feed-carrier D traversed past the same, provisions $A^2$ for holding the several leaves strongly in passing the first beaters, provisions $A^9$, for subsequently holding the leaves on the carrier with very gentle force, and provisions T for shifting the leaves laterally, all combined and arranged to serve substantially as herein specified.

4. In a machine for cleaning fiber having means $B^3$ for beating and cleaning, two series of beaters arranged to act in succession on the several leaves, a feed-carrier D traversed past the same, provisions $A^2$ for holding the several leaves strongly in passing the first beaters, provisions $A^9$ for subsequently holding the leaves on the carrier with very gentle force, provisions T for shifting the leaves laterally, a flexible band L and carrying-pulleys $K'$ $K^2$ $K^3$ therefor, and the chain D and wheel F, all combined and arranged to serve substantially as herein specified.

5. In a machine for cleaning fiber having means for beating and cleaning, two series of beaters arranged to act in succession on the several leaves, a feed-carrier D traversed past the same, provisions $A'$ $A^2$ for holding the several leaves strongly in passing the first beaters, provisions $A^9$ for relaxing the grip of the feeding device after passing the first beaters, provisions $A^7$, T, for shifting the leaves laterally, and a flexible traversing band L and carrying-pulleys $K'$ $K^2$ $K^3$ therefor, and the chain D and wheel F, in combination with a bottom chain P and carrying-wheels O and Q and adjustable pressing means arranged to hold the leaves with great force and carry them past the second beaters, all substantially as herein specified.

In testimony that I claim the invention above set forth I affix my signature in presence of two witnesses.

MANUEL PRIETO.

Witnesses:
J. B. CLAUTICE,
M. F. BOYLE.